US012645279B2

(12) United States Patent
Gudapati

(10) Patent No.: US 12,645,279 B2
(45) Date of Patent: Jun. 2, 2026

(54) NETWORK CONTROL TECHNIQUES FOR IMPROVING ENERGY EFFICIENCY DURING IGNITION-OFF IN ELECTRIFIED VEHICLES

(71) Applicant: FCA US LLC, Auburn Hills, MI (US)

(72) Inventor: Abhilash Gudapati, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 104 days.

(21) Appl. No.: 18/619,359

(22) Filed: Mar. 28, 2024

(65) Prior Publication Data

US 2025/0306661 A1 Oct. 2, 2025

(51) Int. Cl.
| | |
|---|---|
| *G06F 1/3206* | (2019.01) |
| *G06F 1/3209* | (2019.01) |
| *G06F 1/3287* | (2019.01) |
| *H04L 12/40* | (2006.01) |
| *H04L 67/12* | (2022.01) |

(52) U.S. Cl.
CPC .......... *G06F 1/3206* (2013.01); *G06F 1/3209* (2013.01); *G06F 1/3287* (2013.01); *H04L 12/40013* (2013.01); *H04L 67/12* (2013.01); *H04L 2012/40215* (2013.01); *H04L 2012/40273* (2013.01)

(58) Field of Classification Search
None
See application file for complete search history.

(56) References Cited

U.S. PATENT DOCUMENTS

| | | | |
|---|---|---|---|
| 10,086,709 B2 | 10/2018 | Roberts et al. | |
| 11,338,754 B1 * | 5/2022 | Schmenk | G08B 21/02 |
| 11,554,731 B2 | 1/2023 | Chen et al. | |
| 2011/0168462 A1 | 7/2011 | Stanek et al. | |
| 2011/0307141 A1 * | 12/2011 | Westerlage | G07C 5/008 701/31.4 |
| 2014/0354195 A1 | 12/2014 | Li et al. | |

FOREIGN PATENT DOCUMENTS

CN 103182949 B 7/2013

* cited by examiner

*Primary Examiner* — Paul Yen
(74) *Attorney, Agent, or Firm* — Jeremy J. Klobucar

(57) ABSTRACT

A network control method for improving energy consumption by an electrified vehicle during ignition-off involves a supervisory controller configured to control a propulsion system or electrified powertrain of the electrified vehicle and a security gateway (SGW) module. The supervisory controller and the SGW module are each connected to a controller area network (CAN) of the electrified vehicle and the CAN includes a plurality of buses. When one of a plurality of conditions exist to keep one or more of the plurality of buses of the CAN awake during an ignition-off period, the supervisory controller sends a signal to the SGW module that causes it to only communicate on a specific set of buses of the plurality of buses of the CAN to thereby reduce energy consumption of components on the CAN that would have otherwise been awoken by the SGW module.

19 Claims, 4 Drawing Sheets

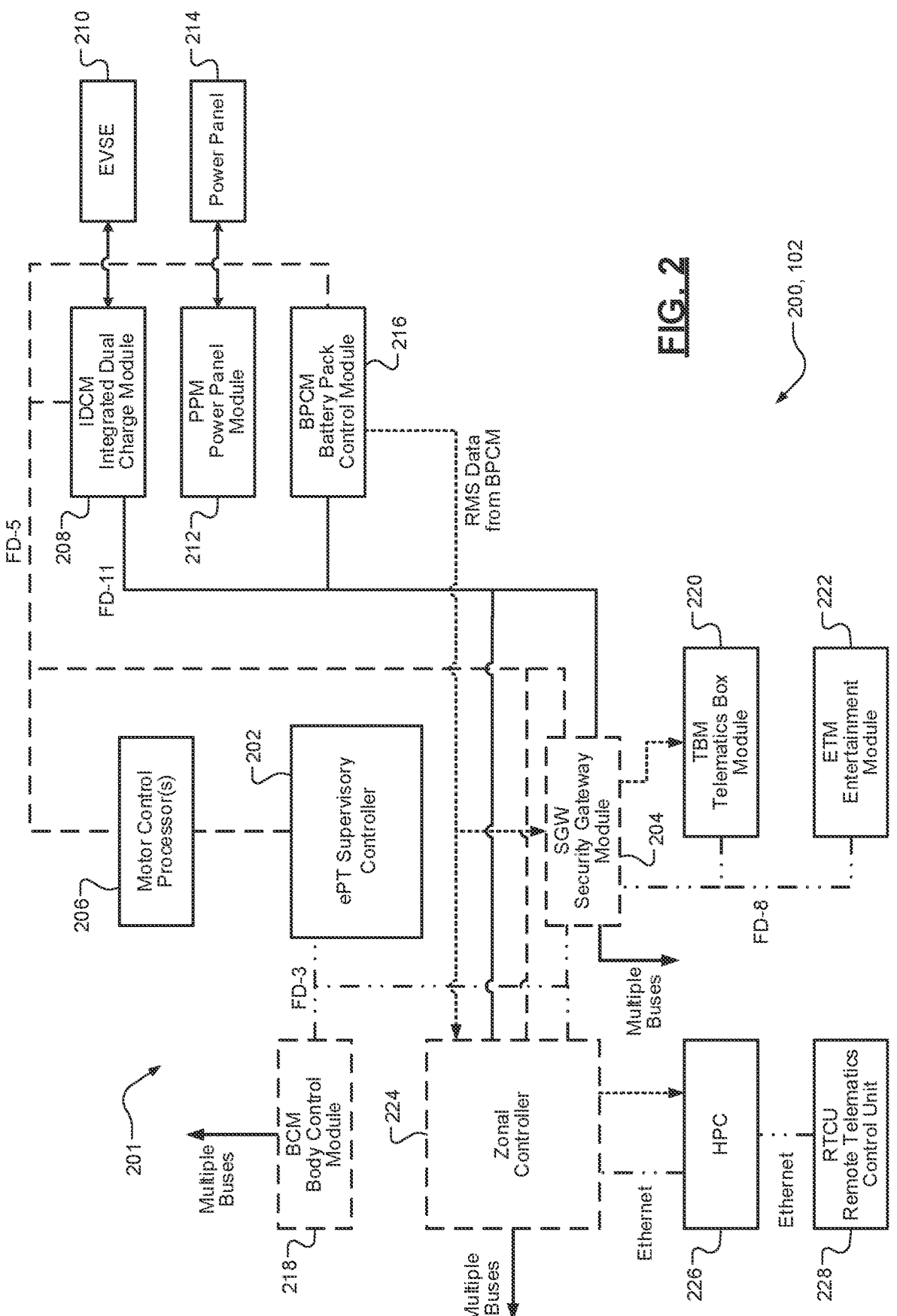

EVSE — 210

Power Panel — 214

IDCM
Integrated Dual
Charge Module — 208

PPM
Power Panel
Module — 212

BPCM
Battery Pack
Control Module — 216

RMS Data
from BPCM

FD-5

FD-11

Motor Control
Processor(s) — 206 ePT Supervisory
Controller — 202

SGW
Security Gateway
Module — 204

TBM
Telematics Box
Module — 220

ETM
Entertainment
Module — 222

FD-8

FD-3

BCM
Body Control
Module — 218

Zonal
Controller — 224

Multiple
Buses — 201

Multiple
Buses

Multiple
Buses

HPC — 226

Ethernet

Ethernet

RTCU
Remote Telematics
Control Unit — 228

NETWORK CONTROL TECHNIQUES FOR IMPROVING ENERGY EFFICIENCY DURING IGNITION-OFF IN ELECTRIFIED VEHICLES

FIELD

The present application generally relates to vehicle network management and, more particularly, to network control techniques for improving energy efficiency during ignition-off in electrified vehicles.

BACKGROUND

Today's vehicles include a plurality of controllers or electronic control units (ECUs) arranged and connected in a vehicle network. Most vehicle networks follow AUTOSAR® network management rules, including controller area network flexible data rate (CAN-FD) and automotive Ethernet networks. One of these network management rules is active wakeup, which involves any controller/ECU that is waking up entire bus(es) associated therewith. During ignition-off periods, there are many vehicle functions that require a high voltage system to be enabled (e.g., high voltage battery system recharging). As active networking typically causes a majority or all of the vehicle network to wakeup, this results in substantial low voltage (12V) power drain that decreases electrified vehicle efficiency. Accordingly, while such conventional vehicle network management techniques do work for their intended purpose, there exists an opportunity for improvement in the relevant art.

SUMMARY

According to one example aspect of the invention, a network control system for improving energy consumption by an electrified vehicle during ignition-off is presented. In one exemplary implementation, the network control system comprises a supervisory controller connected to a controller area network (CAN) of the electrified vehicle and configured to control an electrified powertrain of the electrified vehicle according to a set of high voltage functions, wherein the CAN comprises a plurality of buses and the electrified powertrain includes at least one electric motor powered by a high voltage battery system, and a security gateway (SGW) module connected to the CAN and between the supervisory controller and a plurality of other components on the CAN, wherein when one of a plurality of conditions exist to keep one or more of the plurality of buses of the CAN awake during an ignition-off period, the supervisory controller sends a signal to the SGW module via the CAN that causes the SGW module to only communicate on a specific set of buses of the plurality of buses of the CAN thereby reducing energy consumption of components on the CAN that would have otherwise been awoken by the SGW module.

In some implementations, the signal sent from the supervisory controller to the SGW module overrides existing instructions for the SGW module to activate the plurality of buses of the CAN during the ignition-off period. In some implementations, the plurality of conditions includes a regulatory wakeup condition where reporting of parameters relating to charging of the high voltage battery system are required by regulations. In some implementations, the regulations also require reporting of parameters relating to a vehicle securement state and an ignition status of the electrified vehicle. In some implementations, the SGW module only communicates via one or more respective CAN buses of the plurality of buses of the CAN that are associated with one or more modules performing the parameter reporting and subsequent cloud-based reporting of the reported parameters.

In some implementations, the plurality of conditions includes a unique wakeup condition where reporting of parameters relating to at least one of electric motor status, temperature, and battery charging/health during ignition-off are specified. In some implementations, the SGW module only communicates via one or more respective CAN buses of the plurality of buses of the CAN that are associated with one or more modules performing the parameter reporting and subsequent cloud-based reporting of the reported parameters. In some implementations, the plurality of conditions includes an only-electrified-powertrain wakeup for one or more functions relating to the electrified powertrain during the ignition-off period. In some implementations, the SGW module only communicates on one or more electrified powertrain related buses of the plurality of buses of the CAN. In some implementations, the one or more functions includes a 12V periodic wakeup, battery thermal conditioning, or fuel cell propulsion system (FCPS) after-run/conditioning.

According to another example aspect of the invention, a network control method for improving energy consumption by an electrified vehicle during ignition-off is presented. In one exemplary implementation, the network control method comprises providing a supervisory controller connected to a CAN of the electrified vehicle and configured to control an electrified powertrain of the electrified vehicle according to a set of high voltage functions, wherein the CAN comprises a plurality of buses and the electrified powertrain includes at least one electric motor powered by a high voltage battery system, providing a security gateway (SGW) module connected to the CAN and between the supervisory controller and a plurality of other components on the CAN, and when one of a plurality of conditions exist to keep one or more of the plurality of buses of the CAN awake during an ignition-off period, sending, from the supervisory controller to the SGW module via the CAN, a signal that causes the SGW module to only communicate on a specific set of buses of the plurality of buses of the CAN thereby reducing energy consumption of components on the CAN that would have otherwise been awoken by the SGW module.

In some implementations, the signal sent from the supervisory controller to the SGW module overrides existing instructions for the SGW module to activate the plurality of buses of the CAN during the ignition-off period. In some implementations, the plurality of conditions includes a regulatory wakeup condition where reporting of parameters relating to charging of the high voltage battery system are required by regulations. In some implementations, the regulations also require reporting of parameters relating to a vehicle securement state and an ignition status of the electrified vehicle. In some implementations, the SGW module only communicates via one or more respective CAN buses of the plurality of buses of the CAN that are associated with one or more modules performing the parameter reporting and subsequent cloud-based reporting of the reported parameters.

In some implementations, the plurality of conditions includes a unique wakeup condition where reporting of parameters relating to at least one of electric motor status, temperature, and battery charging/health during ignition-off are specified. In some implementations, the SGW module only communicates via one or more respective CAN buses of the plurality of buses of the CAN that are associated with one or more modules performing the parameter reporting and subsequent cloud-based reporting of the reported parameters. In some implementations, the plurality of conditions includes an only-electrified-powertrain wakeup for one or more functions relating to the electrified powertrain during the ignition-off period. In some implementations, the SGW module only communicates on one or more electrified powertrain related buses of the plurality of buses of the CAN. In some implementations, the one or more functions includes a 12V periodic wakeup, battery thermal conditioning, or fuel cell propulsion system (FCPS) after-run/conditioning.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

BRIEF DESCRIPTION OF THE DRAWINGS

FIG. 2 is a functional block diagram of an example architecture for the example electrified vehicle network control system according to the principles of the present application.

DESCRIPTION

As previously discussed, active networking in controller area network flexible data rate (CAN-FD) and automotive Ethernet networks typically causes substantial low voltage (12V) power drain during ignition-off periods, which decreases electrified vehicle efficiency. During ignition-off periods, there are many vehicle functions that require a high voltage system to be enabled (e.g., high voltage battery system recharging). As active networking typically causes a majority or all of the vehicle network to wakeup, this results in substantial low voltage (12V) power drain that decreases electrified vehicle efficiency. Another network management rule is partial networking, which allows controllers/ECUs to selectively wakeup. Partial networking, however, requires special CAN transceivers and all controllers/ECUs cannot perform partial networking. Thus, partial networking may not be a preferred solution to the above-described problem, as it is up to suppliers whether or not to enable/include this functionality. Yet another potential solution could be a proxi/calibration type (special end-of-line enable/disable process) type solution, but this would not function in all cases (i.e., ignition-off high voltage functions). Accordingly, improved network control systems and methods for improving energy efficiency in electrified vehicles are presented herein. techniques that solve the above-described problems (i.e., ignition-off high voltage functionality) without the need for partial networking or substantial hardware modification.

These improved network control techniques include an electrified powertrain (ePT) supervisory controller performing/completing existing high voltage activity followed by an ignition-off transition. At this time, the ePT supervisory controller determines whether one of a plurality of conditions exist to keep the ePT bus and/or other vehicle CAN bus(es) awake. If so, the ePT supervisory controller will set/send a CAN signal to a security gateway module (e.g., which acts as a firmware over-the-air (FOTA) supervisor module) such that the SGW module only communicates on the specified bus(es) and not on other CAN buses, thereby overriding existing behaviors. The plurality of conditions include (1) regulatory wakeup (e.g., regulatory information reporting during charging), (2) unique wakeup (cloud-based information, for future development purposes), (3) only ePT wakeup (12V periodic wakeup, battery thermal conditioning, FCPS after-run/conditioning). If one of these conditions does not exist, then the CAN signal will be set to no wakeup. In the event of conflicts with a subsequent ignition-on transition or the SGW module receiving existing wakeup reasons, the ePT supervisory controller sets the CAN signal to no request to prevent failure conditions and, when the ePT functions have expired, the vehicle fully powers down.

Figure 1:
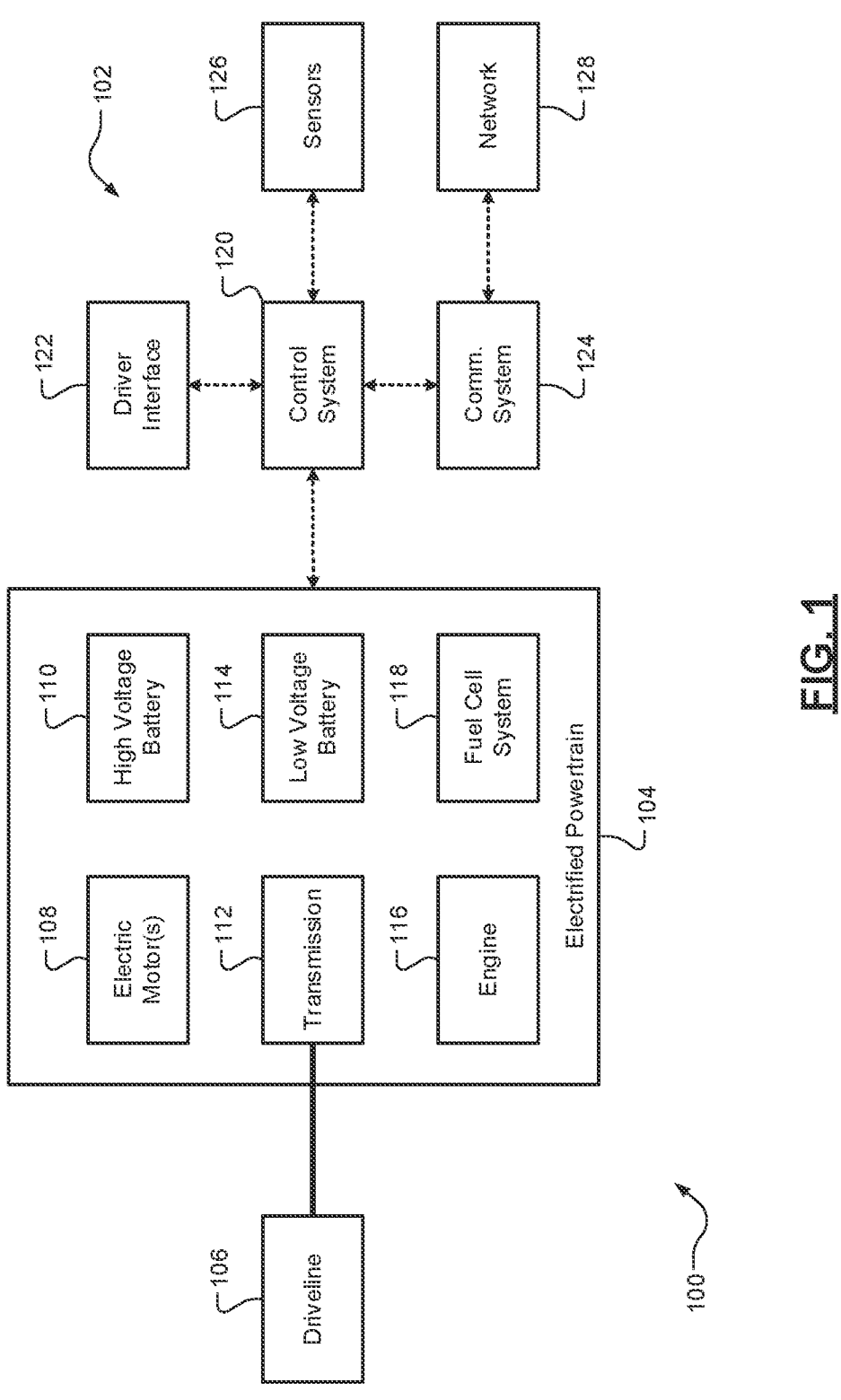
FIG. 1 is a functional block diagram of an electrified vehicle having an example network control system according to the principles of the present application.

Referring now to FIG. 1, a functional block diagram of an electrified vehicle 100 having an example network control system 102 according to the principles of the present application is illustrated. The electrified vehicle 100 generally comprises an electrified powertrain 104 configured to generate and transfer drive torque to a driveline 106 for vehicle propulsion. The electrified powertrain 104 includes at least one electric motor 108 that is powered by a high voltage battery pack or system 110 and is configured to generate torque that is transferred to the driveline 106 via a transmission 112 (e.g., a multi-speed automatic transmission). The electrified powertrain 104 also includes a low voltage (12V) battery system 114 configured to power low voltage loads (not shown). In some implementations, the electrified powertrain 104 further includes an internal combustion engine 116 or a fuel cell system 118 arranged in any suitable configuration and configured to generate additional electrical energy such as for recharging the high voltage battery system 110.

A controller or control system 120 controls operation of the vehicle 100, including primarily controlling the electrified powertrain 104 to generate and transfer a desired amount of drive torque to the driveline 106 to satisfy a driver torque request via a driver interface 122, such as an accelerator pedal. The control system 120 controls the electrified powertrain 104 and other systems as described in greater detail herein based on measurements from a plurality of sensors 126. The plurality of sensors 126 are configured to measure any suitable parameters of the vehicle 100 for use in controlling the same, such as, but not limited to, speeds, torques, temperatures, pressures, and the like. The electrified vehicle 100 also includes a communication system 124 (e.g., one or more transceivers) configured to receive FOTA flash update requests/data from a FOTA master (e.g., a backend server, not shown) via a network 128, such as a long-range wireless communication network (e.g., a cellular data network). The control system 120 is also configured to perform at least a portion of the network control techniques of the present application, which will now be discussed in greater detail below.

Referring now to FIG. 2 and with continued reference to the components of the electrified vehicle 100 shown in FIG. 1, a functional block diagram of an example architecture 200 of the example network control system 102 (also "system 102" herein) according to the principles of the present application is illustrated. As shown, the system 102 includes a CAN 201 that connects, amongst other modules, a primary propulsion or ePT supervisory controller (SC) or "ePT SC" 202 and a security gateway (SGW) module 204. The SGW module 204 could be configured to act as a FOTA supervisor module as previously discussed herein. The system 206 further includes one or more motor control processors (MCPs) 206 for the electric motors 108, respectively, and integrated dual charge module (IDCM) 208 connectable to electrified vehicle supply equipment (EVSE) 210 (a charging cable, a charging station, etc.), a power panel module (PPM) 212 connectable to a power panel 214, and a battery pack control module (BPCM) 216 configured for monitoring/control of the high voltage battery system 110. It will be appreciated that there could be other non-illustrated modules, such as an engine control module (ECM) associated with the engine 116 and/or a fuel cell propulsion system (FCPS) module associated with the fuel cell system 118.

In some implementations, the ePT SC 202 is in communication with the SGW module 204, the MCPs 206, the IDCM 208, the BPCM 216, and a zonal controller 224 on CAN bus FD-5 (an "ePT bus") and the SGW module 204 is also in communication with the IDCM 208, the BPCM 216 on CAN bus FD-11. The system 102 further includes a body control module (BCM) 218, a telematic box module (TBM) 220, an entertainment module (ETM) 222. In a zonal architecture-type implementation, the system 100 includes one or more of the zonal controllers 224 (e.g., one per zone of the electrified vehicle 100), each having high-performance computing (HCP) components 226 and a remote telematics control unit (RTCU) 228 associated therewith on a Ethernet bus for communication with edge controllers/ECUs. In such a zonal-type architecture where there are a plurality of zonal controllers 224, there will not be an SGW module 204 or a BCM 218 (i.e., these functions will be performed by the HPC components 226 of the zonal controller 224). The SGW module 204 is in communication with the TBM 220 and the ETM 222 on CAN bus FD-8 and the SGW module 204 is in communication with the ePT SC 202, the BCM 218, and the zonal controller(s) 224 on CAN bus FD-3.

The SGW module 204 and the BCM 218 (or the zonal controller(s) 224) are also connected to multiple other buses. As shown, the BPCM 216 is configured to report or transmit RMS data or other suitable data to the TBM 220 (via the SGW module 204) or to the zonal controller(s) 224 and the HPC(s) 226. This reported data could then be shared on the cloud (e.g., uploaded to a remote server via the communication device 124 and the network 128). While only RMS data reporting is shown, it will be appreciated that there can be multiple types of data reporting, such as discharging, charging without RMS, low voltage (12V) recharging, and the like, where there is no necessity of communication on any other bus that would cause ePT wakeup. Another example is the unique wakeup, where no other bus except for ePT and telematics buses are required to be woken up.

Figure 3A:
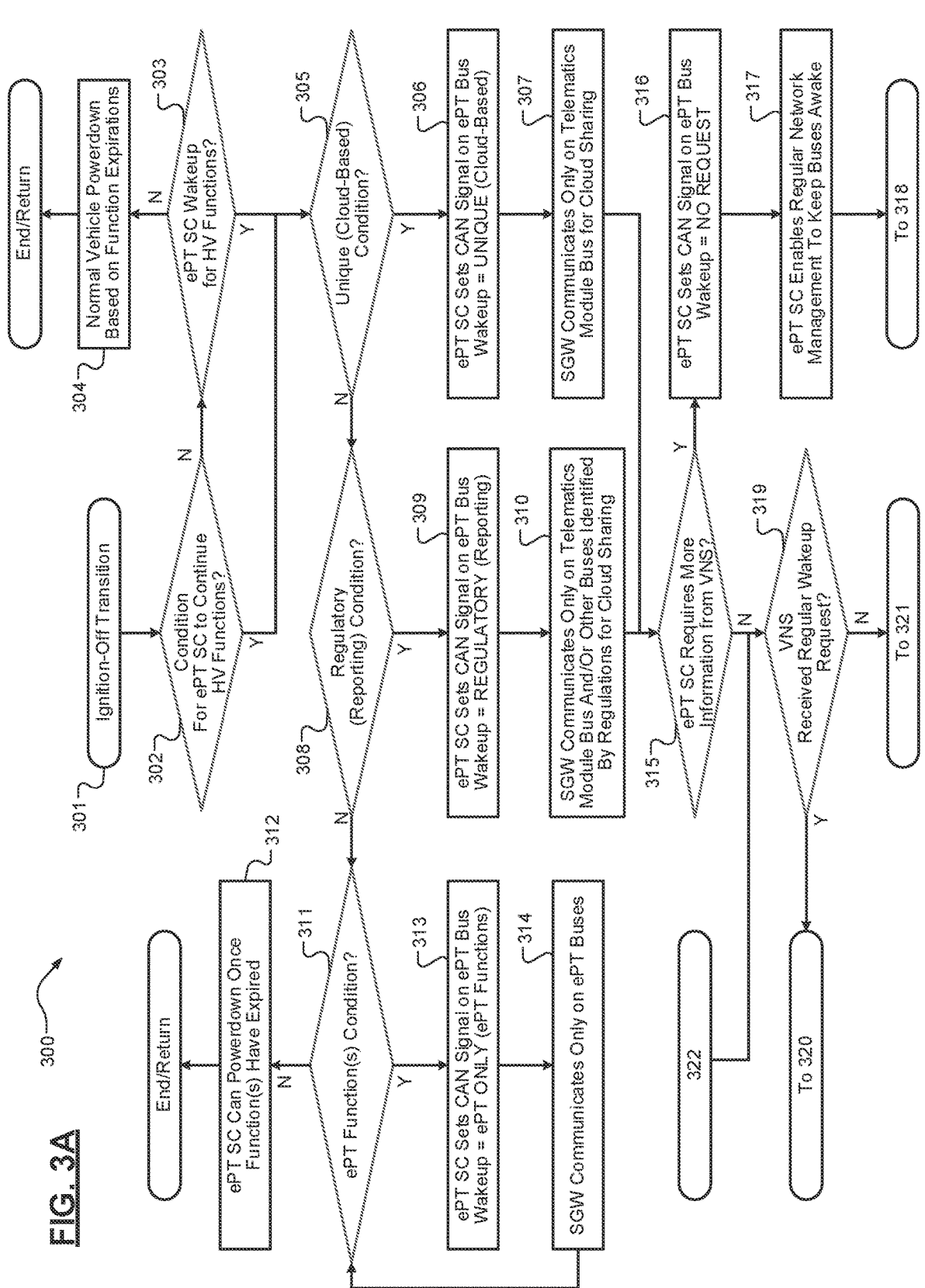
FIGS. 3A-3B are a flow diagram of an example network control method for improving energy efficiency during ignition-off in an electrified vehicle according to the principles of the present application.
Figure 3B:
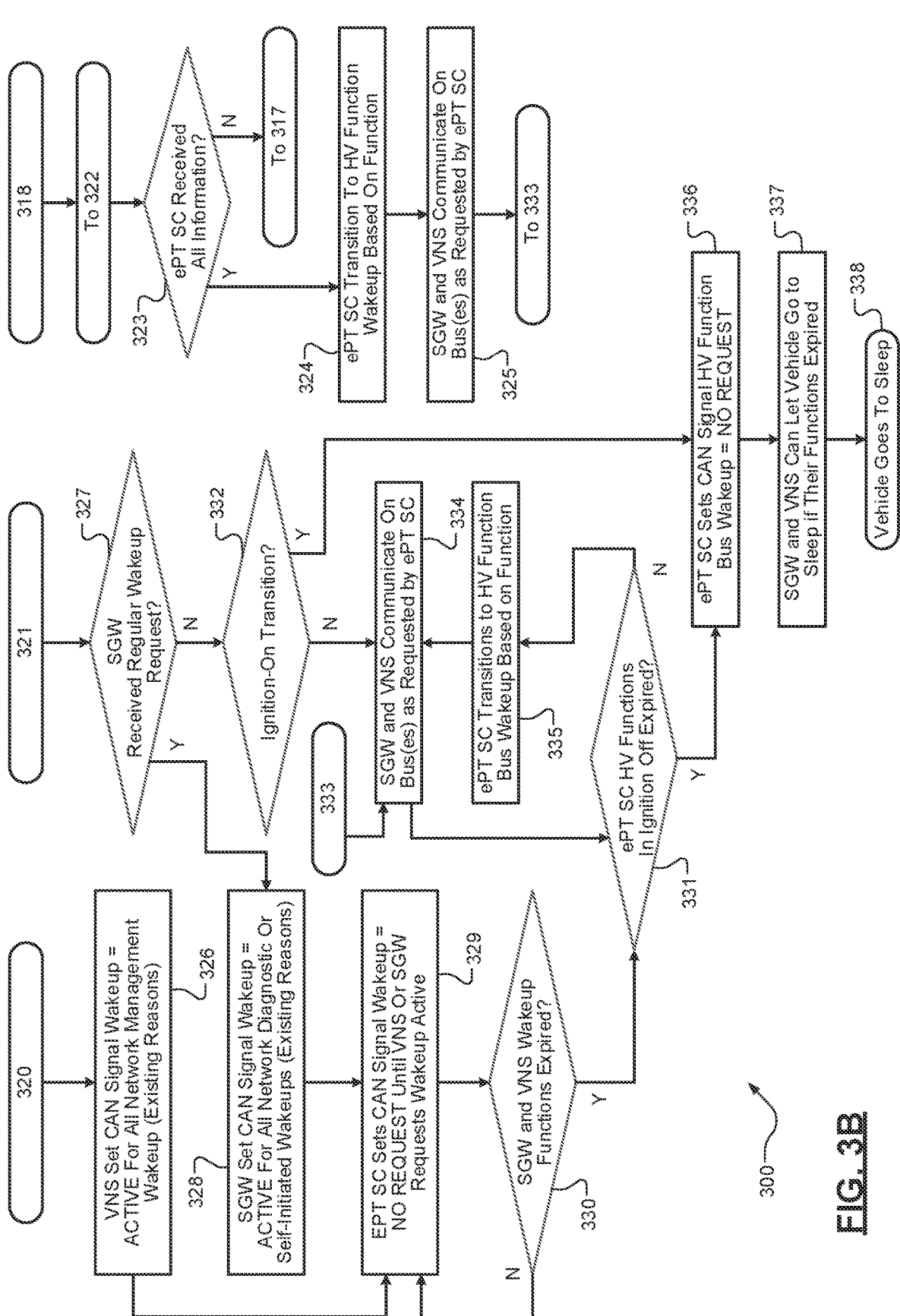

Referring now to FIG. 3, a flow diagram of an example network control method 300 for improving energy efficiency in an electrified vehicle according to the principles of the present application is illustrated. While the method 300 specifically references the electrified vehicle 100 and the network control system 102, 200 for illustrative/descriptive purposes, it will be appreciated that the method 300 could be applicable to any suitably configured electrified vehicle/network. The method 300 begins at 301. At 301, an ignition-off transition is detected. At 302, the ePT SC 202 determines whether one of a plurality of conditions exists or is present to continue its high voltage (HV) functions. When false, the method 300 proceeds to 303. When true, the method 300 proceeds to 305. At 303, a determination is made whether the ePT SC 202 determines whether there is a wakeup request for its HV functions. When false, the method 300 proceeds to 304 where a normal vehicle powerdown (based on function expirations) occurs and the method 300 ends or returns to 301. When true, the method 300 proceeds to 305. At 305, the ePT SC 202 begins determining which of the conditions exists or is present to continue its HV functions. More specifically, at 305, the ePT SC 202 first determines whether buses need to remain awake for communicating with the cloud for unique requirements (e.g., future functions). When true, the method 300 proceeds to 306. When false, the method 300 proceeds to 308.

At 306, the ePT SC 202 sets a CAN signal (HV Function Bus Wakeup) to UNIQUE wakeup through the ePT bus. At 307, the SGW module 204 communicates only on the buses with the TBM 220 to connect with the cloud for sharing of the information (e.g., from the BPCM 216). The method 300 then proceeds to 315. At 308, the ePT SC 202 next determines whether buses need to remain awake for communicating with the cloud for regulatory requirements (e.g., charging related monitoring or reporting of any other critical information as indicated by regulations, such as vehicle securement, ignition statuses, and the like). When true, the method 300 proceeds to 309. When false, the method 300 proceeds to 311. At 309, the ePT SC 202 sets the CAN signal (HV Function Bus Wakeup) to REGULATORY wakeup through the ePT bus. At 310, the SGW module 204 communicates only on the buses with the TBM 220 (or other buses as indicated by regulations, such as vehicle securement or ignition statuses, as discussed above) to connect with the cloud for sharing of the information. The method 300 then proceeds to 315. At 311, the ePT SC 202 finally determines whether only the ePT buses need to remain awake for ePT functions. When false, the method 300 proceeds to 312 where the ePT SC 202 is allowed to powerdown once its functions have expired and the method 300 ends or returns to 301. When true, the method 300 proceeds to 313 where the ePT SC 202 sets the CAN signal (HV Function Bus Wakeup) to ONLY ePT wakeup through the ePT bus. At 314, the SGW module 204 communicates only on the ePT buses and the method 300 returns to 311.

At 315, the ePT SC 202 determines whether it requires more information from the vehicle network supervisor (VNS). The VNS represents a supervisory controller/module for most of the vehicle, and thus can be the BCM 218 in a non-zonal architecture or the zonal controllers 224 or their respective HPC components 226 for zonal-type architectures. VNS wakeups in zonal-type architectures, for example, will go to all zonal controllers 224 so that they do not wake up their respective edge controllers/ECUs. When false, the method 300 proceeds to 319. When true, the method 300 proceeds to 316. At 316, the ePT SC 202 sets the CAN signal (HV Function Bus Wakeup) to NO REQUEST. Ay 317, the ePT SC 202 enables regular network management to keep buses awake. From 318, the method 300 splits to 322 and to 323. At 323, the ePT SC 202 determines whether it has received all necessary information. When false, the method 300 returns to 317. When true, the method 300 proceeds to 324 where the ePT SC 202 transitions to HV function wakeup based on its functions. At 325, the SGW module 204 and the VNS communicate on bus(es) requested by the ePT SC 202 and the method 300 proceeds to 333. At 319, the VNS determines whether a regular wakeup request has been received. When true, the method 300 proceeds to 320. When false, the method 300 proceeds to 321. From 320, the method 300 proceeds to 326 where the VNS sets the CAN signal (VNS Wakeup) to ACTIVE for all network management wakeups (existing reasons for network management). The method 300 then proceeds to 328. From 321, the method 300 proceeds to 327 where the SGW module 204 determines whether a regular wakeup request has been received. When false, the method 300 proceeds to 332. When true, the method 300 proceeds to 328.

At 328, the SGW module 204 sets the CAN signal (SGW Wakeup) to ACTIVE for all network diagnostics or self-initiated wakeups (existing reasons for network management). The method 300 then proceeds to 329. At 329, the ePT SC 202 sets the CAN signal (HV Function Bus Wakeup) to NO REQUEST until the VNS or the SGW module 204 requests active wakeup. At 330, it is determined whether the SGW module 204 and the VNS wakeup functions have expired. When true, the method 300 proceeds to 331. When false, the method 300 returns to 329. At 332, it is determined whether an ignition-on transition has occurred. When true, the method 300 proceeds to 336. When false, the method 300 proceeds to 334, which is also where the method 300 proceeds from 333. At 334, the SGW module 204 and the VNS communicate on the bus(es) requested by the ePT SC 202 (similar to step 325). The method 300 then proceeds to 331. At 331, the ePT SC 202 determines whether its HV functions in ignition-off have expired. When false, the method 300 proceeds to 335 where the ePT SC 202 transitions to the HV function bus wakeup based on its functions and the method 300 returns to 334. When true, the method 300 proceeds to 336. At 336, the ePT SC 202 sets the CAN signal (HC Function Bus Wakeup) to NO REQUEST. At 337, the SGW module 204 and the VNS can let the electrified vehicle 100 go to sleep if their functions have expired. An ignition-off transition can also occur here, after which the method 300 could proceed return to 301. Then, at 338, the vehicle goes to sleep and the method 300 ends or returns to 301.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A network control system for improving energy consumption by an electrified vehicle during ignition-off, the network control system comprising:

a supervisory controller connected to a controller area network (CAN) of the electrified vehicle and configured to control an electrified powertrain of the electrified vehicle according to a set of high voltage functions, wherein the CAN comprises a plurality of buses and the electrified powertrain includes at least one electric motor powered by a high voltage battery system; and a security gateway (SGW) module connected to the CAN and between the supervisory controller and a plurality of other components on the CAN, wherein when one of a plurality of conditions exist to keep one or more of the plurality of buses of the CAN awake during an ignition-off period, the supervisory controller sends a signal to the SGW module via the CAN that causes the SGW module to only communicate on a specific set of buses of the plurality of buses of the CAN thereby reducing energy consumption of components on the CAN that would have otherwise been awoken by the SGW module, wherein the plurality of conditions includes a regulatory wakeup condition where reporting of parameters relating to charging of the high voltage battery system is required by regulations, and wherein the regulations also require reporting of parameters relating to a vehicle securement state and an ignition status of the electrified vehicle.

2. The network control system of claim 1, wherein the signal sent from the supervisory controller to the SGW module overrides existing instructions for the SGW module to activate the plurality of buses of the CAN during the ignition-off period.

3. The network control system of claim 1, wherein the SGW module only communicates via one or more respective CAN buses of the plurality of buses of the CAN that are associated with one or more modules performing the parameter reporting and subsequent cloud-based reporting of the reported parameters.

4. The network control system of claim 1, wherein the plurality of conditions includes a unique wakeup condition where reporting of parameters relating to at least one of electric motor status, temperature, and battery charging/health during ignition-off is specified.

5. The network control system of claim 4, wherein the SGW module only communicates via one or more respective CAN buses of the plurality of buses of the CAN that are associated with one or more modules performing the parameter reporting and subsequent cloud-based reporting of the reported parameters.

6. The network control system of claim 1, wherein the plurality of conditions includes an only-electrified-powertrain wakeup for one or more functions relating to electrified powertrain during the ignition-off period.

7. The network control system of claim 6, wherein the SGW module only communicates on one or more electrified powertrain related buses of the plurality of buses of the CAN.

8. The network control system of claim 7, wherein the one or more functions includes a 12V periodic wakeup, battery thermal conditioning, or fuel cell propulsion system (FCPS) after-run/conditioning.

9. A network control method for improving energy consumption by an electrified vehicle during ignition-off, the network control method comprising:

providing a supervisory controller connected to a controller area network (CAN) of the electrified vehicle and configured to control an electrified powertrain of the electrified vehicle according to a set of high voltage functions, wherein the CAN comprises a plurality of buses and the electrified powertrain includes at least one electric motor powered by a high voltage battery system;

providing a security gateway (SGW) module connected to the CAN and between the supervisory controller and a plurality of other components on the CAN; and when one of a plurality of conditions exist to keep one or more of the plurality of buses of the CAN awake during an ignition-off period, sending, from the supervisory controller to the SGW module via the CAN, a signal that causes the SGW module to only communicate on a specific set of buses of the plurality of buses of the CAN thereby reducing energy consumption of components on the CAN that would have otherwise been awoken by the SGW module, wherein the plurality of conditions includes a regulatory wakeup condition where reporting of parameters relating to charging of the high voltage battery system is required by regulations, and wherein the regulations also require reporting of parameters relating to a vehicle securement state and an ignition status of the electrified vehicle.

10. The network control method of claim 9, wherein the signal sent from the supervisory controller to the SGW module overrides existing instructions for the SGW module to activate the plurality of buses of the CAN during the ignition-off period.

11. The network control method of claim 9, wherein the SGW module only communicates via one or more respective CAN buses of the plurality of buses of the CAN that are associated with one or more modules performing the parameter reporting and subsequent cloud-based reporting of the reported parameters.

12. The network control method of claim 9, wherein the plurality of conditions includes a unique wakeup condition where reporting of parameters relating to at least one of electric motor status, temperature, and battery charging/health during ignition-off is specified.

13. The network control method of claim 12, wherein the SGW module only communicates via one or more respective CAN buses of the plurality of buses of the CAN that are associated with one or more modules performing the parameter reporting and subsequent cloud-based reporting of the reported parameters.

14. The network control method of claim 9, wherein the plurality of conditions includes an only-electrified-powertrain wakeup for one or more functions relating to the electrified powertrain during the ignition-off period.

15. The network control method of claim 14, wherein the SGW module only communicates on one or more electrified powertrain related buses of the plurality of buses of the CAN.

16. The network control method of claim 15, wherein the one or more functions includes a 12V periodic wakeup, battery thermal conditioning, or fuel cell propulsion system (FCPS) after-run/conditioning.

17. A network control method for improving energy consumption by an electrified vehicle during ignition-off, the network control method comprising:

providing a supervisory controller connected to a controller area network (CAN) of the electrified vehicle and configured to control an electrified powertrain of the electrified vehicle according to a set of high voltage functions, wherein the CAN comprises a plurality of buses and the electrified powertrain includes at least one electric motor powered by a high voltage battery system;

providing a security gateway (SGW) module connected to the CAN and between the supervisory controller and a plurality of other components on the CAN; and when one of a plurality of conditions exist to keep one or more of the plurality of buses of the CAN awake during an ignition-off period, sending, from the supervisory controller to the SGW module via the CAN, a signal that causes the SGW module to only communicate on a specific set of buses of the plurality of buses of the CAN thereby reducing energy consumption of components on the CAN that would have otherwise been awoken by the SGW module, wherein the plurality of conditions includes an only-electrified-powertrain wakeup for one or more functions relating to the electrified powertrain during the ignition-off period.

18. The network control method of claim 17, wherein the SGW module only communicates on one or more electrified powertrain related buses of the plurality of buses of the CAN.

19. The network control method of claim 18, wherein the one or more functions includes a 12V periodic wakeup, battery thermal conditioning, or fuel cell propulsion system (FCPS) after-run/conditioning.

* * * * *